United States Patent [19]

Kirkpatrick et al.

[11] Patent Number: 4,826,196

[45] Date of Patent: May 2, 1989

[54] FOLDING WHEELCHAIR

[75] Inventors: George R. D. Kirkpatrick, Brea; John R. Trescott, Azusa, both of Calif.

[73] Assignee: Sitgo Corporation, Placentia, Calif.

[21] Appl. No.: 115,755

[22] Filed: Nov. 2, 1987

[51] Int. Cl.[4] .................................... B62B 7/10

[52] U.S. Cl. .................................... 280/650; 280/657; 297/DIG. 4; 297/50

[58] Field of Search ....... 280/647, 650, 657, 242 WC, 280/289 WC, 655; 297/17, 22, 46, 47, 48, 49, 50, 51, 52, 53, 55, 58

[56] References Cited

U.S. PATENT DOCUMENTS

| | | | |
|---|---|---|---|
| 3,627,343 | 12/1971 | Meyer | 280/39 |
| 3,889,963 | 6/1975 | Brattgard | 280/36 |
| 4,025,088 | 5/1977 | Rothschild | 280/644 |
| 4,057,288 | 11/1977 | Schwartz et al. | 297/239 |
| 4,058,341 | 11/1977 | Prins | 297/48 |
| 4,164,354 | 8/1979 | Rodaway | 280/42 |
| 4,231,614 | 11/1980 | Shaffer | 287/330 |
| 4,248,443 | 2/1981 | Ohlson | 280/39 |
| 4,273,350 | 6/1981 | Williams | 280/242 |
| 4,281,849 | 8/1981 | Chandick et al. | 280/655 |
| 4,322,093 | 3/1982 | Otto | 280/650 |
| 4,380,343 | 4/1983 | Lovell et al. | 280/242 |
| 4,415,177 | 11/1983 | Hale et al. | 280/650 |
| 4,457,535 | 7/1984 | Takeuchi et al. | 280/650 |
| 4,575,113 | 3/1986 | Doudreau | 280/650 |

OTHER PUBLICATIONS

"Compax, Light Weight Wheelchair", Conraid Products, Inc.

"Lightweight Travel Chair", Dr. Leonard's Health Care Catalog.

"Wheelchairs", Sears Specialog, 1986-87-Home Health Care.

"Special-Use Wheelchairs", Sears Specialog, 1986-87-Home Health Care.

"Pogon", Sales Literature, Theradyne Corporation.

"Universal Companion Chair", Everst & Jennings.

*Primary Examiner*—Charles A. Marmor

*Assistant Examiner*—Donn McGiehan

*Attorney, Agent, or Firm*—Knobbe, Martens, Olson & Bear

[57] ABSTRACT

A portable wheelchair having a metal wire frame is provided. The individual frame members are interconnected by clinched loop, hinged connections, and fold together in a manner that minimizes the space required for the stored configuration of the wheelchair. The metal wire fabrication also minimizes the wheelchair weight and the visual profile of the wheelchair in its deployed configuration.

17 Claims, 4 Drawing Sheets

Fig. 4
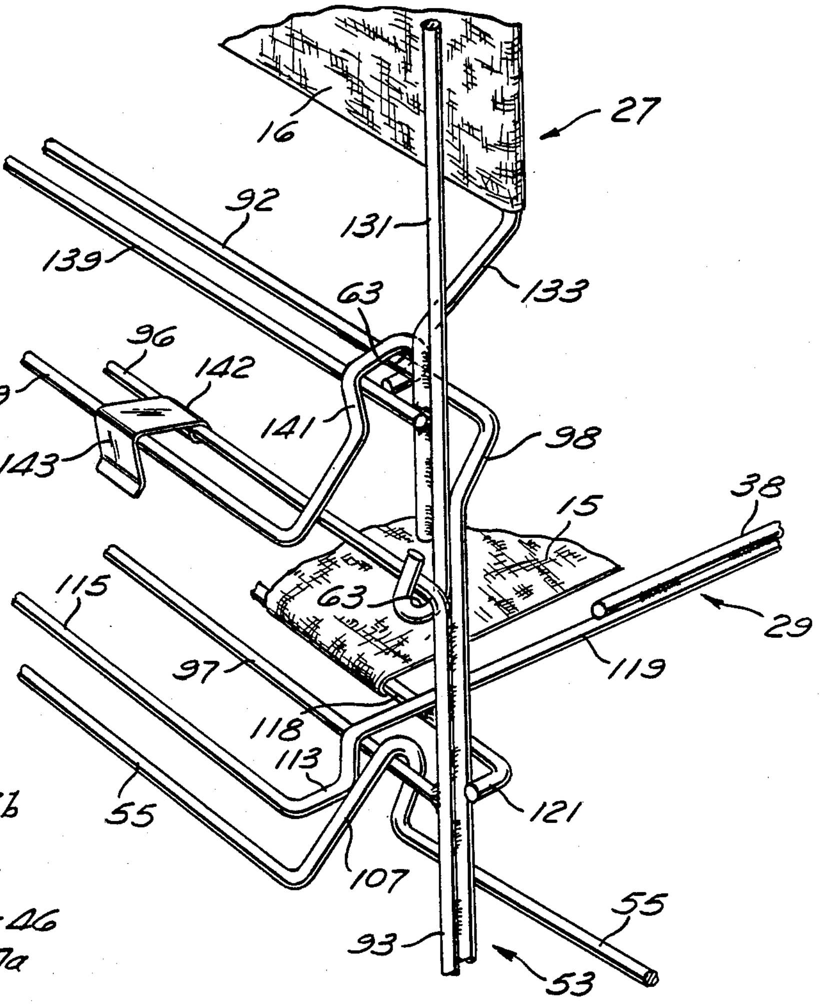
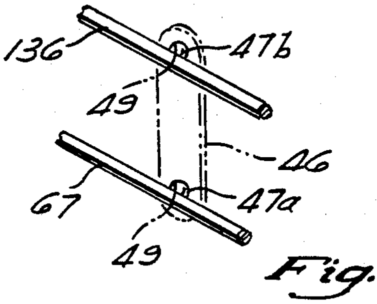
Fig. 11
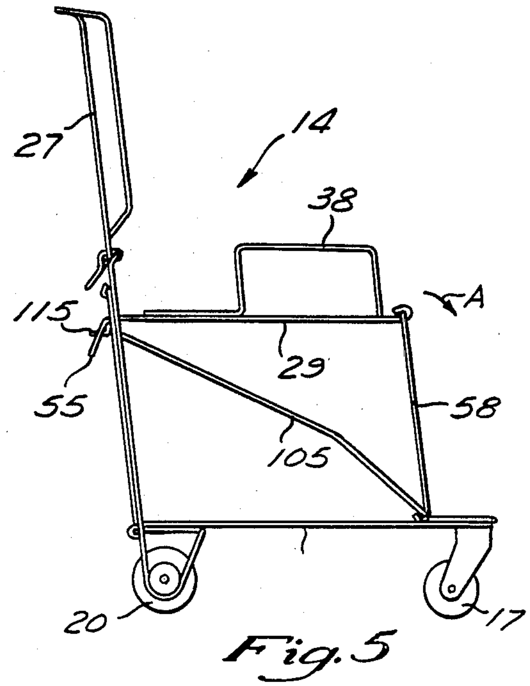
Fig. 5
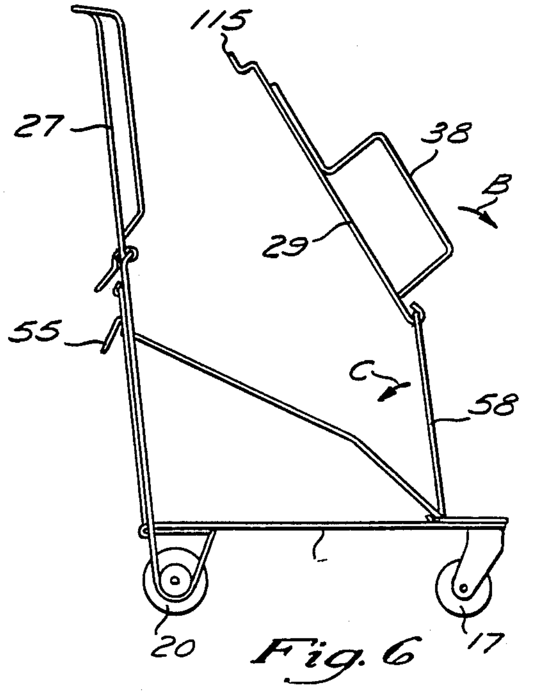
Fig. 6

FOLDING WHEELCHAIR

BACKGROUND OF THE INVENTION

1. Field of the Invention

The present invention relates to wheelchairs, and more particularly to a lightweight, folding wheelchair that due both to its weight and to the ease by which it may be collapsed and deployed, enables this wheelchair to be advantageously used in conjunction with other forms of private and public transportation for those persons requiring ambulatory assistance.

2. Description of the Prior Art

Built to support persons who have difficulty or are unable to walk, wheelchairs have traditionally been formed of steel pipes (tubes) arranged in a framework that is mounted on wheels. The steel pipes have provided a heavy, rigid, and stable support for the riders. In recent years, the number of persons suffering some degree of ambulatory incapacity has increased while, at the same time, a radical change has occurred with respect to the role of the handicapped in society. The handicapped have been included in the individual and minority rights movements of the past twenty years, resulting in a wide range of statutory regulations designed to increase opportunities for access and to enhance the mobility of the handicapped. Moving from a position "outside" of society, in the out-of-sight, out-of-mind category, the disabled and handicapped are being recognized as a valuable resource that must not be squandered due to artificial barriers.

Chief among these barriers has been the difficulty of the ambulatory disabled to fully make use of the elaborate public and private transportation system that is so much a part of both business and private life. Traditional wheelchairs with their weight and bulk, severely limit the ability of the disabled to travel. In response, many attempts have been made to produce "portable" wheelchairs by decreasing the weight and creating a lower profile with one of various types of folding mechanisms.

One of the more common folding wheelchairs provides a seat supported on a framework having a scissors-like bracing. Folding consists of collapsing the chair about a central pivot formed by the bracing, causing the vertical sides to come towards one another. This approach, in its permutations, is illustrated by Meyer (U.S. Pat. No. 3,627,343), Rodaway (U.S. Pat. No. 4,164,354) and Takeuchi, et al. (U.S. Pat. No. 4,457,535). Although the mechanism enabling its collapse can at times be ingenious in design, the structural framework for these chairs tended towards the traditional. These wheelchairs have continued to rely upon metal tubes for the framework. While the use of this material results in a sturdy folding wheelchair, it also results in a wheelchair that is generally too heavy to be of practical use while traveling.

Whether one is traveling on a plane, bus or other form of public transportation with a person requiring the assistance of a wheelchair, or in a private car, it is often necessary to assist that person to the vehicle and then to store the wheelchair during transit. In these instances, the wheelchair must be folded and carried to the storage location. The chore of carrying a heavy chair can rapidly become a problem, particularly when required to do so several times over the course of a day. The benefits of a lightweight wheelchair that provides ease in handling by even a small person, without undue strain, is readily apparent—whether over the course of a vacation or merely during an afternoon shopping excursion. In response, some use has recently been made of the "new," lightweight metal alloys, as, for example, in the sports wheelchairs. However, mere reduction in weight does not address another important design criteria for foldable wheelchairs.

In addition to reducing weight, it is also desirable to have a wheelchair that will fold into a small, non-bulky configuration that may be easily handled during transportaton and/or storage. Previous designs, using a hollow tubing and complex folding or support mechanisms to create a folding wheelchair, are of the type shown by Williams (U.S. Pat. No. 4,273,350) where a plurality of toggle braces (pivotal arms) are used to hold two opposite frames at a predetermined distance, and by Hale, et al. (U.S. Pat. No. 4,415,177) where a pivotal "spider mechanism" is utilized to fold the wheelchair. These and similar designs have achieved folding at the expense of an unwieldy folded end product. Attempts to reduce the bulkiness of the folded wheelchair have included wheelchairs that combine a scissors frame with a secondary folding process, as is illustrated by Lovell, et al. (U.S. Pat. No. 4,380,345) and Rothschild (U.S. Pat. No. 4,025,088). However these wheelchairs have only seemed to complicate the collapse and set-up operations, while doing little to decrease the "bulk" or increase the ease of handling of the collapsed chair.

In addition to being cumbersome to transport and store, the bulkiness of a wheelchair design also detrimentally affects the image or appearance projected by the wheelchair. The previous folding wheelchairs tended to evoke the images of a standard or medical wheelchair, of the type used by hospitals and found in traditional medical environments. While such wheelchairs are used by many people, this type of wheelchair tends to draw attention to the user, whether due to its intimidating manner or to the institutional connotations it evokes. People who might otherwise benefit from the use of a wheelchair—whether for certain specific activities or just on a temporary basis, will refrain from using a wheelchair because of a perceived stigma associated with such use. This can have the affect of functionally handicapping that person, where a "lower profile," i.e., less bulky wheelchair might prevent and/or avoid this situation in its entirety.

The bulky, portable wheelchairs produce a still further problem, one of even greater subtlety than the refusal to use a wheelchair based upon what others might think. Recent studies have shown that those persons suffering some form of disability carry a "burden of guilt" regarding the demands their condition places on the time and energy of their companions. A bulky portable wheelchair, by its weight and clumsiness, only aggravates this problem, resulting in a greater degree of isolation for that person than would otherwise be required by the disability.

SUMMARY OF THE INVENTION

The present invention has as an underlying objective the improvement in the previously available wheelchairs by fabricating the outer frame of wire and providing a series of hinges in the outer frame, about which a reversible sequence of erection and teardown operations may be quickly performed. The wire framework and hinged interconnections cooperatively provide a wheelchair of less bulk and having a dimensionally smaller collapsed form.

The wheelchair of the present invention was designed for the convenience of both the person requiring ambulatory assistance and their companion. The wire construction of the outer, support framework significantly reduces the weight as well as the general "bulky" appearance shared by the presently available wheelchairs. Hinges formed of wire, within and as part of the wire supportive framework, are so located that the outer framework is divided into a sequence of foldable sections, permitting the wheelchair to be rapidly collapsed into a compact configuration that is easily carried and conveniently stored when not in use.

Such "compactness" is even more advantageous when traveling on commercial transportation. Whether by bus, plane, or train, the narrow aisles and limited storage space make the use of standard wheelchairs and indeed many of the collapsible wheelchairs impracticable. For such occasions, and even for those everyday occasions when a person travels by automobile to go shopping or to attend an activity away from the home, it is desireable to have a collapsible wheelchair that will easily fold into a configuration that will fit within the available storage space. Further complicating this equation is the continuing pressure to maximize passenger space and minimize weight in vehicles and airframes, both at the expense of storage areas. For example, as automobiles continue to "downsize," the ability of a compact, folded wheelchair to be placed in the rear seat or luggage compartment without damaging the car will grow increasingly important.

Additionally, many persons, although able to walk, are sufficiently impaired that the use of a wheelchair on an occasional or "as needed" basis could significantly increase their mobility, affecting both the enjoyment and quality of their lives. Unfortunately, to the extent that the institutional appearance alone does not discourage use of the wheelchairs, the cumbersomeness of the chairs thwarts all but the most determined. The present invention, which at first glance may not appear to be a wheelchair, provides a considerably lighter profile and removes the stigma usually associated with the use of the more massive institutional wheelchair. The mobility of the impaired person is increased since that person need no longer decline invitations to travel, whether such previous travel aversion was the result of a perceived "handicapped" stigma or due to a belief that they were placing a "burden" on their companion.

In addition to its use as a collapsible or folding wheelchair, as described above, the novel design of the present invention allows the wheelchair to be partially folded and form a luggage carrier. In this embodiment, the seat portion is folded or collapsed from its upright position, and is placed in contact with the base frame to form a carrying or support surface. Objects may then be placed upon the partially folded seat and wheeled about, without placing any strain on the user.

Various other objects, advantages, and features of the present invention will become readily apparent from the ensuing detailed description, and the novel features will be particularly pointed out in the appended claims.

BRIEF DESCRIPTION OF THE DRAWINGS

FIG. 4 is an enlarged perspective view taken substantially along the line 4—4 of FIG. 1, showing the seat and seat back locking mechanisms according to the present invention;

FIGS. 5 through 9 are schematic side elevational views showing the collapsing or folding sequence for the wheelchair;

FIG. 11 is an enlarged view showing a locking strap suitable for use to secure the wheelchair when in the deployed configuration position.

DETAILED DESCRIPTION OF THE PREFERRED EMBODIMENT

Figure 1:
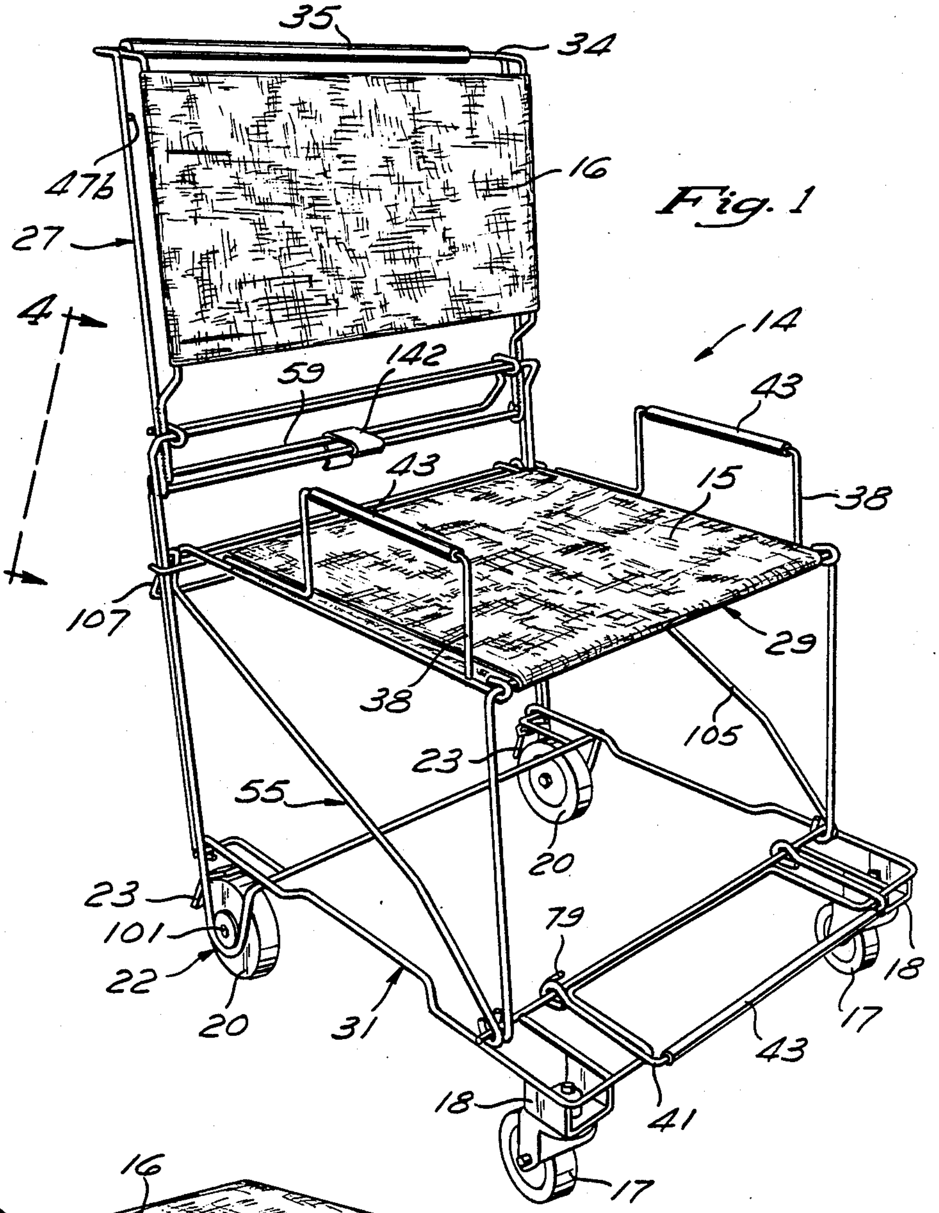
FIG. 1 is a perspective view showing a fully deployed or erected wheelchair according to the present invention.

FIG. 1 shows a wheelchair 14 having a framework fabricated out of metal wire, with a fabric or canvas seat 15 and backresting 16 attached thereto. Mobility of the wheelchair 14 is provided by a pair of front wheels 17, which are swivel-mounted to a corresponding pair of front-wheel housings 18, and a pair of rear wheels 20, each mounted in a corresponding rear wheel housing 22. The swivel-mounting of the front wheels 17 provides 360° rotation of the front wheels 17; however, the back wheels 20 are preferably rigidly affixed to the rear wheel housing 22 in a manner prohibiting rotation about a vertical axis.

The present embodiment of the invention shown in FIG. 1 depicts the wheels 17, 20 of equal diameter, but various diameters may be readily adapted to the wheelchair 14. Generally, wheels of larger diameter provide greater riding comfort and decreased rolling resistance over "softer" surfaces such as rugs or non-paved, outdoor surfaces. However, larger diameter wheels are at times more difficult to swivel, and thus a possible compromise (not shown) provides for the swivel-mounted front wheels 17 to be of a different (smaller) diameter than the rear wheels 20. Additionally, it is also contemplated that a braking mechanism 23 is provided for the rear wheels 20. The brake 23 shown in FIG. 1 is an "exterior" type of wheel brake, known as the Darnell Wheel Lock, and is manufactured by the Darnell Corporation of Downey, Calif.; however, other brakes, including integral brakes, would be equally effective, as would locating the brake on the front wheels 17 instead of or in addition to on the rear wheels 20.

Although it will be described in much greater detail in association with FIG. 3, the deployed wheelchair 14 of FIG. 1 may initially be described as a framework consisting of a backrest assembly 27 attached to a seat frame assembly 29, with both in turn mounted on a mobile base assembly 31. In addition to including members to which the backresting 16 is attached, the backrest assembly 27 provides an upper gripping bar 34 to assist a companion in holding on to the wheelchair 14 when propelling it about. A cushion grip 35, such as a foam or a molded plastic, may optionally be applied to the gripping bar 34 for increased comfort.

Increase in comfort to the user of the wheelchair 14 is provided by a pair of side armrests 38 attached to the seat assembly 29. In addition to providing a place to rest one's arms, the armrests 38 also "define" a space and provide a sense of lateral security to someone sitting in the wheelchair 14. Additional comfort is provided by a swing-away footrest 41, attached to the base assembly 31. The swing-away feature permits the footrest 41 to be moved out of the way when the user is either entering or leaving the wheelchair 14. Both the armrests 38 and the footrest 41 may be provided with a trim 43, of such material as, for example, polyethylene.

Figure 2:
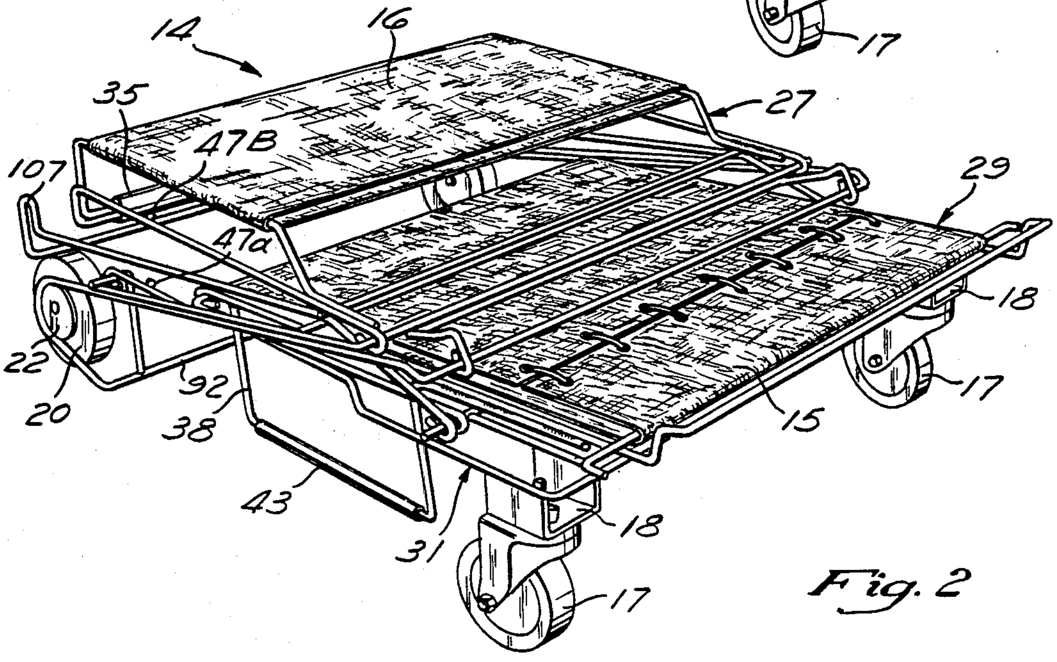
FIG. 2 is a perspective view similar to FIG. 1 showing the wheelchair once collapsed into its folded configuration.

FIG. 2 shows the same wheelchair 14 as in FIG. 1, with the wheelchair 14 collapsed or folded for transportation or storage. To provide an appreciation for the extent to which the wheelchair 14 has been collapsed, the seat assembly has been collapsed and rotated in such a manner that the side armrests 38 now extend towards and almost reach, the plane containing the surface-abrading portions of the wheels 17, 20. Likewise the backrest assembly 27 has been collapsed and rotated in a manner placing it and the backresting 16 in a plane that is substantially parallel to both the seat assembly 29 and the base assembly 31. From initial outer dimensions of approximately 35×20×30 inches, in a preferred embodiment, the collapsed or folded wheelchair 14 has been reduced in size to approximately 9×20×28 inches.

To retain the wheelchair 14 in the collapsed configuration shown in FIG. 2 during transportation or periods of other non-use, a retaining strap 46, as shown in FIG. 11, is applied to a pair of projections 47*a* and 47*b*, which are vertically aligned and located proximate to one another when the wheelchair 14 is in a folded or collapsed configuration. The retaining strap 46 preferably comprises a thin band of metal or plastic, having a pair of apertures 49 appropriately sized to snap over the projections 47*a* and 47*b*, which may, for example, be provided in a rounded or "ball" shape. Alternatively, the retaining strap 46 may consist of a simple canvas strap (not shown) having a retaining mechanism such as a buckle or Velcro TM. Once the retaining strap 46 is applied, the wheelchair 14 may be easily carried or placed in storage without having to worry about the inadvertent, partial deployment of the folded wheelchair 14.

Although in no way meant to limit the present invention, each assembly or component part of the frame may be fabricated from segments of a single diameter metal wire. Metals including aluminum and steel wires are acceptable depending upon their stress strength. For example, appropriate wire might include No. 1018 AISI Steel of 5/16 inch diameter and $\frac{3}{8}$-7/16 inch diameter aluminum alloy wire. Of course, many other metals are acceptable, with the diameter of wire chosen to obtain sufficient stress strength from a particular metal or alloy affecting both the "bulk" and the weight of the finished wheelchair. To a great extent, the maximum acceptable weight is a marketing decision and is not to be viewed as in any way limiting the scope of the present invention; however, a significant advantage over the previously available wheelchairs is obtained by not exceeding a total weight of approximately 20 pounds.

While it is possible to construct the wire framework members out of different lengths of a single diameter, wire, it has also been learned that the lower stress encountered by the backrest lock 59 permits the usage of smaller diameter wire, (for example, $\frac{1}{4}$-inch in diameter of 1018 steel). Likewise, the large stress loads placed upon the front leg 58 requires the use of a reinforcement tubing 61 (see FIG. 3), such as 11/32-inch inner diameter tubing of 1018 steel. Additionally, although a presently preferred embodiment makes use of a nickel-chrome plating, the wire frame may alternatively be powder coated to obtain any one of numerous, available colors using well-known techniques. The present invention is in no way to be viewed as limited by either color or the particular type or treatment of the metal wire selected for the frame.

After selection of the particular metal wire that is to be used, the wire is cut to the appropriate size and then bent into the proper shape. To achieve the collapse depicted in FIG. 2 requires an extensive amount of free, relative rotation about many different axes. Under the present invention, this is made possible through the loop means of attachment that is used to connect the various assemblages and components. An open loop 63 is formed at each wire end that is to be joined to a component or an assembly. During assembly of the wheelchair 14, each of the open loops 63 is clinched, rotatably connecting the assemblages and the components.

Figure 3:
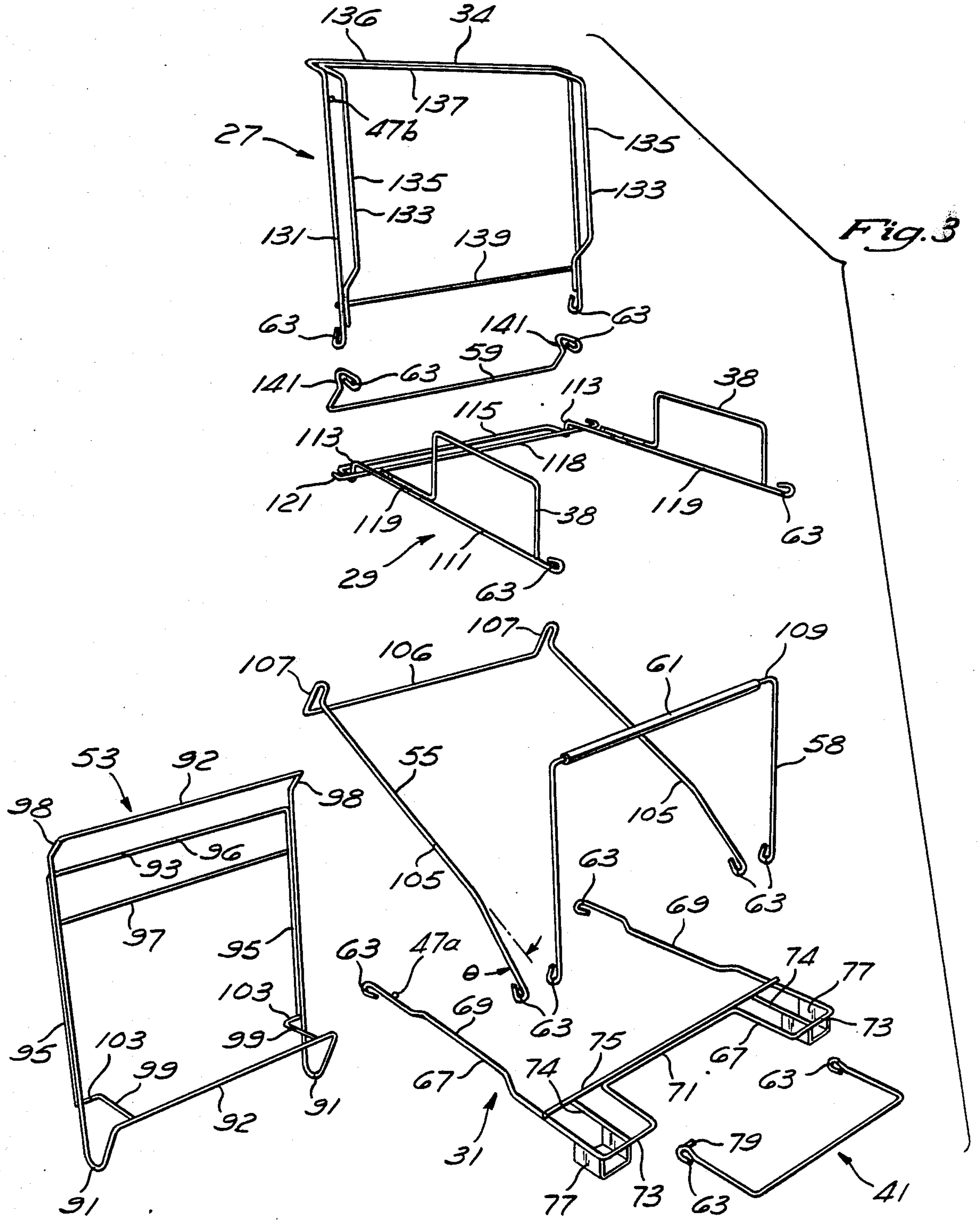
FIG. 3 is an exploded perspective view showing the individual wire elements making up the wheelchair framework according to the present invention.

The mechanism for achieving the remarkable collapse evidenced by comparing FIGS. 1 and 2 will be disclosed after first closely examining the structure of the wheelchair 14, shown best by FIG. 3. The functional interrelationships will then be described utilizing FIGS. 5 through 9.

The wheelchair 14 is provided with a wire framework made up of a number of components, which consist of an appropriate length of wire bent into a specific shape, and several assemblies, which may be defined as two or more individual wire segments that have been welded together to form a rigid structure. As shown by FIG. 2, in addition to the backrest, the seat, and the base assemblies 27, 29, 31 previously discussed, a rear leg assembly 53 is also provided, and cooperates with both the base assembly 31 and the backrest assembly 27 in the assembled wheelchair 14. With respect to components, besides the footrest 41, there are three additional components: a cross brace 55 and a front leg 58 that together support and stabilize the seat assembly 29; and the backrest lock 59 that helps maintain the backrest assembly 27 as a rigid linear extension of the rear leg assembly 53 when the wheelchair 14 is fully deployed.

In a similar manner to aeronautical designs, where weight is a key design criteria, the present wheelchair frame design has attempted to remove all unnecessary structure except the necessary load-bearing members. It is recognized that there may be other assemblages and component parts wherein the individual load-bearing members depart in number and/or shape from the members shown in FIG. 3. However, the present invention is not to be viewed as being so limited and is intended to also include and comprehend the nature of cooperation between the assemblages and component parts—and indeed the general cooperation between the members themselves.

Turning now to the present, preferred embodiment of the invention, as shown by FIG. 3, the various assemblages and components have been separated from one another to assist in the discussions thereof. The base assembly 31 has been designed to form, in conjunction with the rear leg assembly 53 and the cross brace component 55, a stable foundation for the wheelchair 14.

The front and rear wheels 17, 20 (shown in FIG. 1) are attached to the base assembly 31 and to the rear leg assembly 53, respectively.

A U-shaped base frame 67, having a pair of lateral indents 69 and a front indent 71 formed therein, makes up the largest part of the base assembly 31. In addition to providing an area available for the placement of the feet of a user when entering or leaving the wheelchair, the front indent 71 forms a pair of front brackets 73 that, with a pair of support members 74 and a front support brace 75, provide a suitable location for attaching the front wheels 17 to the base assembly 31. A pair of swivel brackets 77 of conventional design comprise the principal member of the front wheel housing 18 (FIG. 1), and are attached to the front brackets 73 forming the preferred attachment structures for the front wheels 17. The base frame 67 is completed by the formation of the open loops 63 on the two free ends.

Although technically a separate assembly, the footrest 41 can almost be considered as part of the base frame 67, and, in point of fact, is attached to the front support brace 75 utilizing a pair of open loops 63 formed on the free ends of the U-shaped footrest 41. Attachment is made in such a manner that the footrest 41 rests upon both of the front brackets 73 for support when in its lowered position. When raised, a stop 79 is attached to the footrest 41 adjacent to one of the open loops 63 in a manner that engages the adjacent front bracket 73 as the footrest 41 is rotated counter clockwise about the front support brace 75. In this manner, the footrest 41 may be maintained in a raised position, greatly enhancing the access to and ability to egress from the wheelchair 14.

Figure 12:
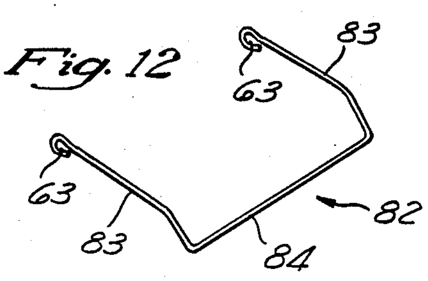
FIG. 12 is a perspective view showing an alternate footrest wire element that is acceptable for use with the wheelchair according to the present invention.

Referring momentarily to FIG. 12, an extended footrest 82 may be optionally attached to the wheelchair 14 to provide increased comfort to persons having longer legs. In addition to providing a greater length, the extended footrest 82 is provided with a pair of angled lateral extensions 83 that act to lower the foot support base 84. The extended footrest 82 is attached to the front support brace 75 in a similar manner as described previously for the footrest 41, utilizing the clinched open loops 63.

Referring once again to FIG. 3, a pair of rear brackets 91, located on the rear leg assembly 53 provide a rear leg frame structure to which the rear wheels 20 are preferably attached. Consisting of a continuous rectangular loop 92, to which a U-shaped reinforcement member 93 has been attached, preferably by welding along a pair of shared lateral extensions 95, the rear leg assembly 53 provides the majority of seat support. Lateral stability is provided by both a backrest support member 96 formed as the base of the reinforcement member 93 and a seat support member 97 attached to and linearly connecting the two lateral extensions 95. It is to be understood that the seat support member 97 need not be linear as shown. Manufacturing convenience may suggest replacing the linear member shown in the drawings by a two member, cross-bracing system that is not shown, but is well within the alternatives available to one of ordinary skill in the art of wire frame fabrication. The rear leg assembly 53 is thereafter attached to the backrest assembly 27, utilizing open loops 63 formed on the backrest assembly 27, which are clinched onto the backrest support member 96 of the reinforcement member 93. A bend 98 is placed in the rectangular loop 92 at a position opposite that of the rear brackets 91 to enable a linear relationship to operatively exist between the backrest assembly 27 and the rear leg assembly 53, such that the backrest is in line with the rear legs.

The rear brackets 91 consist of two U-shaped bends formed in the rectangular loop 92 and are completed by a pair of angled supports 99 attached to the rectangular loop 92 on either side of the U-shaped bends. An axle 101 (see FIG. 1) may then be attached to each of the rear brackets 91 at the trough of the U-shaped bends, with the rear wheels 20 then secured in a conventional manner. In addition to functioning as reinforcing members, the angular supports 99 also serve as the point of attachment between the base assembly 31 and the rear leg assembly 53. The open loops 63 formed at the free ends of the base frame 67 are attached to a base leg 103 of the angled supports 99. The base legs 103 thus form an axis of rotation for the rear leg assembly 53 with respect to the base assembly 31.

As previously discussed, the rear leg assembly 53 supports the majority of seat weight. The remainder of weight is supported by the front leg frame component 58 and the cross brace 55. The open loops 63 of the front leg 58 are received by the front support brace 75, as are the open loops 63 formed on the free ends of the U-shaped cross brace 55. Although providing some vertical support for the seat assembly 29, the cross brace 55 is primarily designed to maintain the rear leg assembly 53 and the backrest assembly 27 in an upright position. Because of the precise manner and location of the attachment for the cross brace 55, a pair of angled linear extensions 105 are provided. Preferably an angle $\theta$ of 17° is formed adjacent the open loops 63, approximately $\frac{1}{4}$ to $\frac{1}{3}$ the distance to a base portion 106 of the cross brace 55. Double bends in the base portion 106 create a pair of necked openings 107 that are used as a means for releasably attaching the cross brace 55 to the rear leg assembly 53, being received on the seat support member 97 thereof. A seat-receiving base 109 is formed by the U-shaped front leg component 58, which both receives and is attached to the seat assembly 29. The reinforcement tubing 61 is received by and surrounds the seat receiving base 109. Attachment of the reinforcement tubing 61 is preferably attained by placing the reinforcement tubing 61 on the metal wire segment prior to its formation into the U-shaped configuration of the front leg component 58.

The major component of the seat assembly 29 is a generally U-shaped side rail frame 111. A pair of open loops 63 are formed on the free ends of the side rail frame 111, and serve as the mechanism for rotatably attaching the seat assembly 29 to the front leg component 58, as previously discussed. A pair of right angle double bends 113 are formed in the side rail frame 111 adjacent a frame attachment base portion 115, thereby creating a recessed loop, which is best seen in FIG. 4. The seat assembly 29 is completed by a pair of looped wire segments forming the side armrests 38 and a frame attachment bracket 118 that provides a degree of lateral stability to the seat assembly 29 by virtue of its attachment to and linkage with both of a pair of side rail extensions 119 of the side rail frame 111. More importantly, as will be discussed below in greater detail with reference to FIG. 4, the frame attachment bracket 118 cooperates with the recessed loop attachment base portion 115 to more securely connect the seat assembly 29 and the rear leg assembly 53. Additionally, an angled tip 121 formed on each end of the frame attachment bracket 118 lies adjacent to the lateral extensions 95 of the rear leg assembly 53 when the seat assembly 29 is in the deployed position. The angled tips 121 embrace the lateral extensions 95 and thus further inhibit lateral motion of the seat assembly 29.

The backrest assembly 27 is of a double, U-shaped frame construction, with an outer back support frame 131 attached to an inner, backresting frame 133. With the exception of a pair of lateral loops 135 projecting from a common plane, the back support frame 131 and the backresting frame 133 occupy a nested relationship. The lateral loops 135 support and receive the backresting 16 (as shown in FIG. 1), and a pair of base frame members 136, 137 cooperate to form the gripping bar 34. A backrest support bar 139 is attached to and connects both lateral frame extensions of the base frame members 136, 137, completing the backrest assembly 27 and providing the required structural rigidity. One pair of open loops 63 is provided for attachment of the backrest assembly 27 to the rear leg assembly 53. In a preferred configuration, the free ends of the backresting frame 133 terminate short of the free ends of the back support frame 131, with the open loops 63 formed on the latter.

As the individual assemblies and components shown in FIG. 3 coalesce into the wheelchair 14, the area of maximum interaction between these various structural members lies adjacent to the connection between the backrest assembly 27 and the rear leg assembly 53, best shown in FIG. 4. Although many connections are depicted in FIG. 4, only the two rotatable attachments of the backrest lock 59 to the rectangular loop 92 and the back support frame 131 to the reinforcement member 93 are of a permanent nature. The remainder of the connections are of a selectively releasable, press-fit variety, and are made and "broken" as the wheelchair 14 is deployed and collapsed.

Taking these latter, releasable connections in the order of their establishment, as will be further discussed below, the rotatable connection shown in FIG. 4 between the backrest assembly 27 and the rear leg assembly 53 is made into a linear, rigid connection by making use of the backrest lock 59. The backrest assembly 27 is rotated about an axis of rotation created by the backrest support member 96, to which it is attached, until the back support frame abuts the rectangular loop 92. The backrest lock 59 is then rotated about its connection with the rectangular loop 92 until a support bar engagement surface 141, adjacent the open loop 63, slidably receives an outer surface of the backrest support bar 139 in a press-fit manner. The backrest lock 59 thus acts to clamp the back support frame 131 and the backresting frame 133 of the backrest assembly 27 against the rectangular loop 92 of the rear leg assembly 53. As clamped, rotation is no longer permitted about an axis coincident with the backrest support member 96, and the clinched loop hinge between the backrest support member 96 and the back support frame 131 becomes a rigid connection.

Release of the backrest lock 59 will of course restore the rotatable hinge connection. To prevent the inadvertent release of the backrest lock 59, a safety clip 142 is provided that must first be released before movement of the backrest lock 59 is permitted. Many different clip designs are possible. As shown in FIG. 4, the safety clip 142 may conveniently consist of an L-shaped piece of metal or plastic that is rotatably attached to the backrest support member 96. When the backrest lock 59 is moved into its locked position, an angled extension 143 of the safety clip 142 engages the backrest lock 59 in a snap-fit or friction-type connection. Thereafter, the unlocking of the backrest lock 59 is only possible after disengagement of the safety clip 142.

Installation of the seat assembly 29 first requires placement of the cross brace 55. The necked openings 107 are received by the seat support member 97 of the rear leg assembly 53. The necked openings 107 are dimensioned to create a frictional engagement with the seat support member 97 to assist in maintaining the connection therebetween. Next follows placement of the seat assembly 29, wherein the right angle double bends 113 of the side rail frame 111 slidably engage with the seat support member 97. The frame attachment base portion 115, being offset with respect to the seat support member 97 and the side rail extensions 119, prevents the seat assembly 29 from thereafter backing off the seat support member 97. Simultaneous with the slidable engagement of the double bends 113 and the seat support member 97, the frame attachment bracket 118 and the angled tips 121 slidably embrace the lateral extensions 95 of the rear leg assembly 53. In this manner the frame attachment bracket 118 and the frame attachment base portion 115 act to clamp the seat assembly 29 to the rear leg assembly 53, particularly with respect to movement in or parallel to the plane of the seat assembly 29. Additionally, besides cooperating with the attachment base portion 115, the attachment bracket 118 also prevents the cross brace 55 from entirely backing off of the seat support member 97, so long as the seat assembly 29 is in place on the seat support member 97.

Referring now to FIGS. 5 through 9, the sequence for collapsing or folding the wheelchair 14 will be discussed in further detail. The sequence of deployment may be considered to be the reverse of the following steps. In FIG. 5, the fully deployed wheelchair 14 is shown. Breakdown commences by applying a force to the seat assembly 29 in a direction perpendicular to the plane of the seat assembly 29, freeing the offset, attachment base portion 115 from engagement with the seat support member 97 of the rear leg assembly 53. In the context of an operational wheelchair, the foregoing discussion translates to grasping the frame attachment base portion 115, or, more likely, the side armrests 38, and lifting up. Once free of the seat support member 97, the seat assembly 29 may be rotated clear of the rear leg and back assemblies 53, 27 by pivoting the front leg component 58 in the direction of Arrow A, about both its attachment to the base assembly 31 and its rotatable connection with the seat assembly 29.

In FIG. 6, the seat assembly 29 has been moved sufficiently clear of the backrest assembly 27 as to permit rotation of the seat assembly 29 in the direction of Arrow B, about its connection with the front leg component 58. Simultaneously with the rotation of the seat assembly 29, the front leg component 58 is rotated about its point of attachment to the base assembly 31 in the direction of Arrow C.

Figure 7:
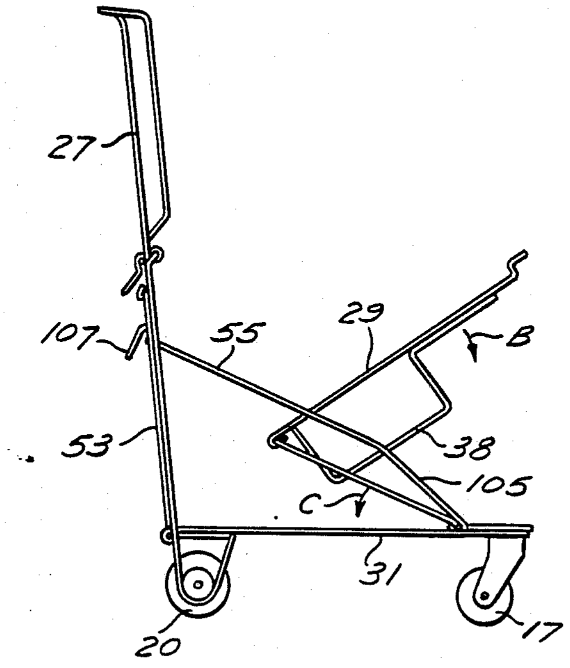
Figure 8:
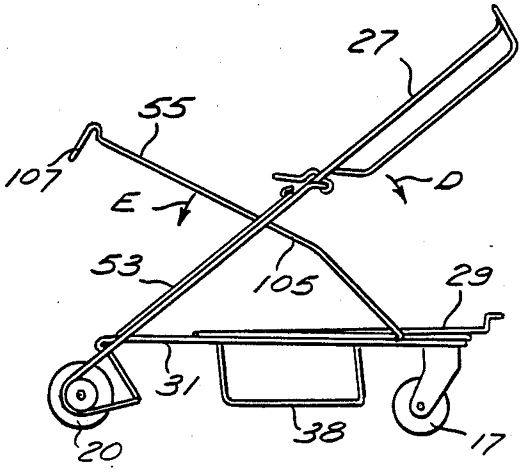
Figure 10:
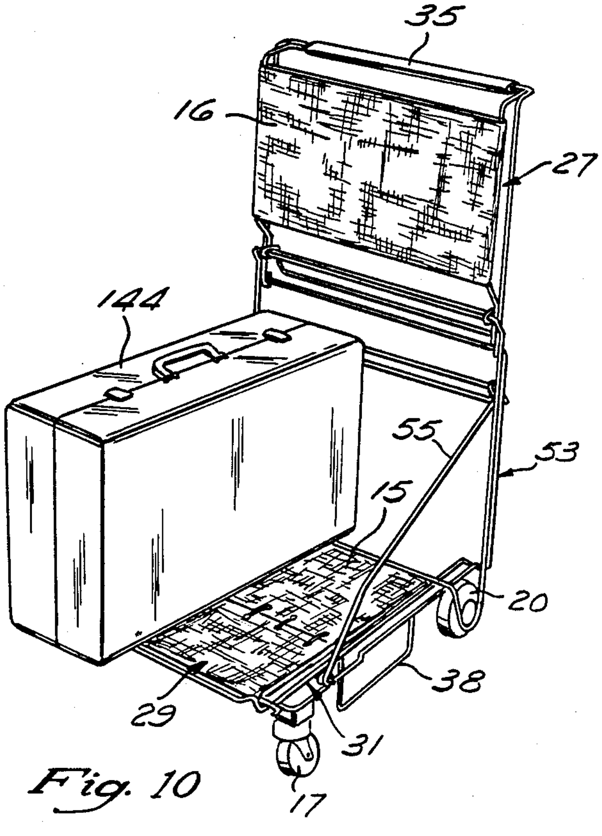
FIG. 10 is a perspective view showing the wheelchair according to the present invention in a partially folded configuration suitable for transporting luggage, as shown.

The purpose of these rotations and counter-rotations, which are shown continuing in FIG. 7, is to obtain the reversal in the positioning of the seat assembly 29, wherein, as is shown by FIG. 8, the side armrests 38 are received between the front and the rear wheels 17, 20 and project below the base assembly 31. The usefulness of this partially disassembled position is shown in FIG. 10, wherein a piece of baggage 144 is placed upon the now-reversed seat assembly 29, overlying the base assembly 31, in the manner of a luggage carrier.

After reversal of the seat assembly 29, the next step requires the disengagement of the neck openings 107 of the cross brace 55 from the seat support member 97. After partial disengagement, the angled linear extensions 105 of the cross brace 55 are permitted to rest upon and ultimately ride down the seat support member 97, moving towards the base assembly 31 in the direction of Arrow E. Simultaneously, the backrest assembly 27 and the still rigidly-engaged rear leg assembly 53, pivot in the direction of Arrow D about the clinched loop attachment of the rear leg assembly 53 to the base assembly 31. This interdependent maneuver is best shown by FIG. 8.

Figure 9:
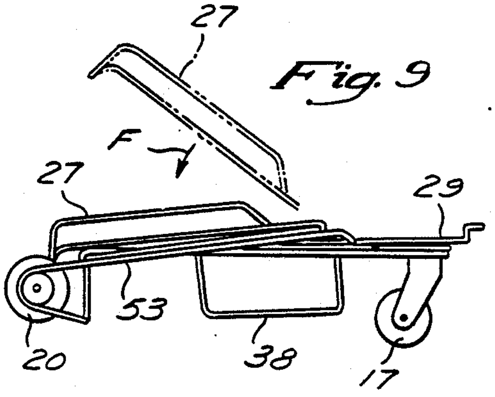

FIG. 9 illustrates the final step of disengaging the locked connection between the rear leg assembly 53 and the backrest assembly 27. After first releasing the safety clip 142, a clockwise rotational force is applied to the backrest lock 59, freeing the clamped engagement of the backrest support bar 139 and the back support frame 131 with the rectangular loop 92 of the rear leg assembly 53. The backrest assembly 27 may then be rotated about its attachment to the backrest support member 96 of the rear leg assembly 53 in the direction of Arrow F, as is shown in phantom in FIG. 9. Once fully collapsed, the inadvertent deployment of the wheelchair 14 is prevented by reliance upon the retaining strap 46 and the associated retention structures formed on the wheelchair 14.

Further modifications and alternative embodiments of the invention will be apparent to those skilled in the art in view of the foregoing description. Accordingly, this description is to be construed as illustrative only, and is for the purposes of teaching those skilled in the art a manner of carrying our the invention, The details of the structure may be varied substantially without departing from the spirit of the invention and the exclusive use of such modifications as comes within the scope of the appended claims is contemplated.

What is claimed is:

1. A foldable wheelchair, comprising:

a base assembly having means for transitional movement over a support surface;

a seat assembly rotatably coupled to said base assembly and selectively rotated between a first, stored position substantially co-planar with said base assembly and a second, deployed position;

a backrest assembly rotatably coupled to said base assembly and selectively rotated between a first, stored position substantially co-planar with said base assembly and a second, deployed position; and a rear leg assembly rotatably coupled to both said base assembly and said backrest assembly, said rear leg assembly selectively rotated between a first, stored position substantially co-planar with said base assembly and a second, deployed position, whereby the wheelchair can be selectively rotated from a deployed structure, capable of supporting a user, to a configuration suitable for storage with the base assembly, the seat assembly, the backrest assembly, and the rear leg assembly all co-planar with respect to one another.

2. A foldable wheelchair as described in claim 1, and further comprising means for releasably attaching said seat assembly to said rear leg assembly.

3. A foldable wheelchair as described in claim 1, and further comprising a cross brace rotatably coupled to said base assembly and having means for the releasable attachment to said rear leg assembly.

4. A foldable wheelchair as described in claim 1, wherein said means for transitional movement comprises a first pair of wheels attached to said base assembly.

5. A foldable wheelchair as described in claim 4, wherein said means for transitional movement additionally comprises a second pair of wheels attached to said rear leg assembly.

6. A portable wire frame wheelchair, comprising:

a base frame;

a rear leg frame attached to said base frame forming a first hinged connection;

a front leg frame attached to said base frame forming a second hinged connection;

a seat frame attached to said front leg frame forming a third hinged connection and having means for releasably attaching said seat frame to said rear leg frame; and a back support frame attached to said rear leg frame forming a fourth hinged connection and having means for locking said back support frame in a selected angular position with respect to said fourth hinged connection, whereby the cooperative rotation about the hinged connections enable the assembled wire frame to be selectively collapsed from the deployed position into a less bulky configuration.

7. A wire frame wheelchair as described in claim 6, and further comprising means for transitional movement over a support surface.

8. A wire frame wheelchair as described in claim 7, wherein each of said hinged connections comprise a clenched loop connection.

9. A wire frame wheelchair as described in claim 7, wherein said means for transitional movement comprises a pair of wheels attached to said base frame.

10. A wire frame wheelchair as described in claim 7, wherein said means for transitional movement comprises a first pair of wheels attached to said base frame using swivel mounting and a second pair of wheels attached to said rear leg frame.

11. A portable wire frame wheelchair, comprising:

a base frame;

a rear leg frame attached to said base frame forming a first clenched loop hinged connection;

a front leg frame attached to said base frame forming a second clenched loop hinged connection;

a seat frame attached to said front leg frame forming a third clenched loop hinged connection and having means for releasably attaching said seat frame to said rear leg frame, wherein said means for releasably attaching comprises an offset portion formed in said seat frame, and a seat support member attached to and made part of said rear leg frame, with said offset portion releasably received by said seat support members;

a back support frame attached to said rear leg frame forming a fourth clenched loop hinged connection and having means for locking said back support frame in a selected angular position with respect to said fourth clenched loop hinged connection; and means for transitional movement over a support surface, whereby the cooperative rotation about the clenched loop hinged connections enable the assembled wire frame to be selectively collapsed from the deployed position into a less bulky configuration.

12. A portable wire frame wheelchair, comprising:

a base frame;

a rear leg frame attached to said base frame forming a first clenched loop hinged connection;

a front leg frame attached to said base frame forming a second clenched loop hinged connection;

a seat frame attached to said front leg frame forming a third clenched loop hinged connection and having means for releasably attaching said seat frame to said rear leg frame;

a back support frame attached to said rear leg frame forming a fourth clenched loop hinged connection and having means for locking said back support frame in a selected angular position with respect to said fourth clenched loop hinged connection, wherein said means for locking comprises a backrest lock attached to said rear leg frame forming a fifth clenched loop hinged connection, said backrest lock pressably securing a backrest support bar attached to and made part of said back support frame, formng a selectively releasable clamped connection between said backrest support bar and said rear leg frame; and means for transitional movement over a support surface, whereby the cooperative rotation about the hinged connections enable the assembled wire frame to be selectively collapsed from the deployed position into a less bulky configuration.

13. A portable wire frame wheelchair, comprising:

a base frame;

a rear leg frame attached to said base frame forming a first hinged connection;

a front leg frame attached to said base frame forming a second hinged connection;

a seat frame attached to said front leg frame forming a third hinged connection and having means for releasably attaching said seat frame to said rear leg frame;

a back support frame attached to said rear leg frame forming a fourth hinged connection and having means for locking said back support frame in a selected angular position with respect to said fourth hinged connection;

a cross-brace attached to said base frame forming a sixth hinged connection, said cross-brace releasably secured to said rear leg assembly; and means for transitional movement over a support surface, whereby the cooperative rotation about the hinged connections enable the assembled wire frame to be selectively collapsed from the deployed position into a less bulky configuration.

14. A wire frame wheelchair as described in claim 13, and further comprising a foot rest attached to said base frame forming a seventh hinged connection.

15. A portable wheelchair of the type having a plurality of interconnected frame members cooperating with one another to form a first, deployed configuration and a second, stored configuration, and to enable the reversible conversion therebetween, wherein the improvement comprises:

a metal wire support framework is provided each of said plurality of frame members, with said metal wire support framework of adjacent frame members providing the interconnections thereof, whereby metal wire is used to provide a skeletal frame for a portable wheelchair.

16. A wheelchair as described in claim 15, wherein each of said interconnections comprise a clenched wire loop connection.

17. A foldable wheelchair of the type having a base assembly, a seat assembly, and a backrest assembly interconnected with one another in a manner providing a first, deployed configuration and a second, folded configuration, wherein the improvement comprises:

a rear leg assembly connecting said backrest assembly to said base assembly; and a plurality of frame members comprising said base, seat, rear leg, and backrest assemblies, said frame members rotatably connected to one another, whereby a reversible sequence of rotational manipulations of the interconnected frame members may be used to selectively obtain said first and said second configurations.

* * * * *